(12) United States Patent
Sharifi et al.

(10) Patent No.: US 9,240,183 B2
(45) Date of Patent: Jan. 19, 2016

(54) REFERENCE SIGNAL SUPPRESSION IN SPEECH RECOGNITION

(71) Applicant: Google Inc., Mountain View, CA (US)

(72) Inventors: Matthew Sharifi, Palo Alto, CA (US); Dominik Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 14/181,374

(22) Filed: Feb. 14, 2014

(65) Prior Publication Data

US 2015/0235651 A1    Aug. 20, 2015

(51) Int. Cl.

| | |
|---|---|
| *G10L 15/20* | (2006.01) |
| *G10L 15/00* | (2013.01) |
| *G10L 15/06* | (2013.01) |
| *G10L 15/22* | (2006.01) |
| *G10L 15/26* | (2006.01) |
| *G10L 21/0208* | (2013.01) |
| *G10L 13/00* | (2006.01) |
| *G10L 15/02* | (2006.01) |
| *G10L 25/24* | (2013.01) |

(52) U.S. Cl.
CPC ............... *G10L 15/20* (2013.01); *G10L 15/222* (2013.01); *G10L 13/00* (2013.01); *G10L 15/02* (2013.01); *G10L 15/26* (2013.01); *G10L 25/24* (2013.01); *G10L 2021/02087* (2013.01)

(58) Field of Classification Search
None
See application file for complete search history.

(56) References Cited

U.S. PATENT DOCUMENTS

| | | | |
|---|---|---|---|
| 5,848,163 A | | 12/1998 | Gopalakrishnan |
| 7,392,188 B2 | | 6/2008 | Junkawitsch |
| 7,417,983 B2 | * | 8/2008 | He et al. ................. 370/352 |
| 7,693,713 B2 | * | 4/2010 | He et al. ................. 704/243 |
| 7,848,314 B2 | * | 12/2010 | Cross et al. ............. 370/352 |
| 8,000,971 B2 | * | 8/2011 | Ljolje ....................... 704/275 |
| 8,046,221 B2 | * | 10/2011 | Ljolje ....................... 704/246 |
| 8,532,991 B2 | * | 9/2013 | He et al. ................. 704/243 |
| 8,612,234 B2 | * | 12/2013 | Ljolje ....................... 704/275 |
| 8,996,372 B1 | * | 3/2015 | Secker-Walker ......... G10L 15/34 704/231 |
| 2005/0080627 A1 | * | 4/2005 | Hennebert et al. ...... 704/270 |
| 2006/0247927 A1 | * | 11/2006 | Robbins et al. ......... 704/225 |

FOREIGN PATENT DOCUMENTS

EP        2107553        7/2009

OTHER PUBLICATIONS

Selfridge et al., "Continuously Predicting and Processing Barge-in During a Live Spoken Dialogue Task," Association for Computational Linguistics, Aug. 2013, 10 pages.
Ljolje et al., "Discriminative Training of Multi-State Barge-in Models," IEEE 2007, 353-358.
Goffin et al., "The AT&T Watson Speech Recognizer," IEEE 2005, 1033-1036.

* cited by examiner

*Primary Examiner* — Satwant Singh (74) *Attorney, Agent, or Firm* — Fish & Richardson P.C.

(57) ABSTRACT

The technology described herein can be embodied in a method that includes receiving a first signal representing an output of a speaker device, and a second signal comprising the output of the speaker device, and an audio signal corresponding to an utterance of a speaker. The method includes aligning one or more segments of the first signal with one or more segments of the second signal. Acoustic features of the one or more segments of the first and second signals are classified to obtain a first set of vectors and a second set of vectors, respectively, the vectors being associated with speech units. The second set is modified using the first set, such that the modified second set represents a suppression of the output of the speaker device in the second signal. A transcription of the utterance of the speaker can be generated from the modified second set of vectors.

16 Claims, 4 Drawing Sheets

REFERENCE SIGNAL SUPPRESSION IN SPEECH RECOGNITION

TECHNICAL FIELD

This disclosure generally relates to speech recognition.

BACKGROUND

Automatic speech recognition can be used in mobile devices and other devices. In general, automatic speech recognition attempts to provide accurate transcriptions of what a person has said.

SUMMARY

In one aspect, this document features a computer-implemented method that includes receiving, at a processing system, a first signal representing an output of a speaker device, and a second signal comprising (i) the output of the speaker device and (ii) an audio signal corresponding to an utterance of a speaker. The method also includes aligning, by the processing system, one or more segments of the first signal with one or more segments of the second signal. The method further includes classifying acoustic features of the one or more segments of the first signal to obtain a first set of vectors associated with speech units, and classifying acoustic features of the one or more segments of the second signal to obtain a second set of vectors associated with speech units. The second set of vectors is modified using the first set of vectors, such that the modified second set of vectors represents a suppression of the output of the speaker device in the second signal. The method can also include providing the modified second set of vectors to generate a transcription of the utterance of the speaker.

In another aspect, this document features a system that includes a speech recognition engine. The speech recognition engine includes memory and one or more processors, and is configured to receive a first signal and a second signal. The first signal represents an output of a speaker device, and the second signal includes i) the output of the speaker device and (ii) an audio signal corresponding to an utterance of a speaker. The speech recognition engine includes a suppression engine that is configured to align one or more segments of the first signal with one or more segments of the second signal. The suppression engine is also configured to classify acoustic features of the one or more segments of the first signal to obtain a first set of vectors associated with speech units, and classify acoustic features of the one or more segments of the second signal to obtain a second set of vectors associated with speech units. The suppression engine is further configured to modify the second set of vectors using the first set of vectors, such that the modified second set of vectors represents a suppression of the output of the speaker device in the second signal.

In another aspect, this document features one or more machine-readable storage devices storing instructions that are executable by one or more processing devices to perform operations. The operations include receiving a first signal representing an output of a speaker device, and a second signal comprising (i) the output of the speaker device and (ii) an audio signal corresponding to an utterance of a speaker. The operations also include aligning one or more segments of the first signal with one or more segments of the second signal. The operations further include classifying acoustic features of the one or more segments of the first signal to obtain a first set of vectors associated with speech units, and classifying acoustic features of the one or more segments of the second signal to obtain a second set of vectors associated with speech units. The second set of vectors is modified using the first set of vectors, such that the modified second set of vectors represents a suppression of the output of the speaker device in the second signal. The operations can also include providing the modified second set of vectors to generate a transcription of the utterance of the speaker.

Implementations can include one or more of the following. The acoustic features can include mel-frequency cepstral coefficients. Each vector in the first set of vectors and the second set of vectors can include a phoneme and an associated weight. Modifying the first set can include identifying one or more speech units that are present in the first set of vectors and the second set of vectors, and adjusting the weights associated with the identified speech units in the second set of vectors such that the identified speech units are suppressed in the modified second set of vectors. The adjusted weights of the modified second set of vectors can be normalized such that a sum of the normalized and adjusted weights is substantially equal to unity. The identified speech units can include phonemes or triphones. The first and second sets of vectors can be computed using an acoustic model. The acoustic model can include one of a Gaussian mixture model (GMM) or a neural network. The one or more segments of the first signal can be aligned with one or more segments of the second signal by computing a cross correlation product between a portion of the first signal and a portion of the second signal, determining whether a magnitude of an identified peak in the cross correlation product satisfies a threshold condition, and determining a temporal alignment based on a position of the identified peak that satisfies the threshold condition. The output of the speaker device can be based on an output of a text-to-speech system.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A more natural human-like spoken interaction can be facilitated between a user and a computing device. Accurate speech recognition can be performed in the event of a "barge-in" by the user during a time when audio from a text-to-speech system, media player, or navigation system is being played back.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Voice-based interactions with computing devices such as smart phones allow for hands-free input, for example, for searching the web, launching an application, storing an appointment, asking a question, getting directions, playing media, or performing another action on the computing device. In response to a voice-based query from a user, the computing device often plays back synthesized audio via a text-to-speech (TTS) system. In some cases, the TTS output played back in response to a query is long, and the user may get the desired information by listening to only a portion of the TTS output. In other cases, the user may decide that the played back TTS output is not providing the desired information, and that a separate spoken query is needed. In such cases, the user may need to "barge in" with another query or other spoken input during a time when the TTS output is still being played back by the computing device. For example, a user can barge in by speaking a predetermined word or phrase (e.g., "stop" or "new query"), or simply ask another question. If the microphone of the computing device is switched on to accept such interruptions by the user, the microphone also captures the audio output from the TTS system. Unless the TTS output is suppressed from the audio captured by the microphone, the TTS output is fed back to the speech recognizer and can affect the accuracy of the speech recognizer in recognizing the actual user input.

In some implementations, the audio that needs to be suppressed may come from sources other than a TTS system. For example, a user may provide a spoken input in the presence of audio output from a media player or navigation system, and a suppression of such audio output may be required for accurately recognizing the spoken input from the user. While this document primarily uses a TTS output as an example of audio that is suppressed for accurate speech recognition, the technology can be used for suppressing other types of audio (e.g., outputs of a media player or navigation system) without deviating from the scope of this disclosure.

The TTS output can be suppressed from the captured audio in multiple ways. For example, adaptive filtering (e.g., echo cancellation techniques) can be used to suppress the TTS output. However, such adaptive filtering is often not adequate to suppress the TTS output, and may also distort the spoken input from the user, thereby affecting recognition accuracy. This document describes techniques for a feature-based suppression of the TTS output that does not unacceptably distort the spoken input (or utterance) of the user, and allows for accurate speech recognition in the event of a "barge-in."

Figure 1:
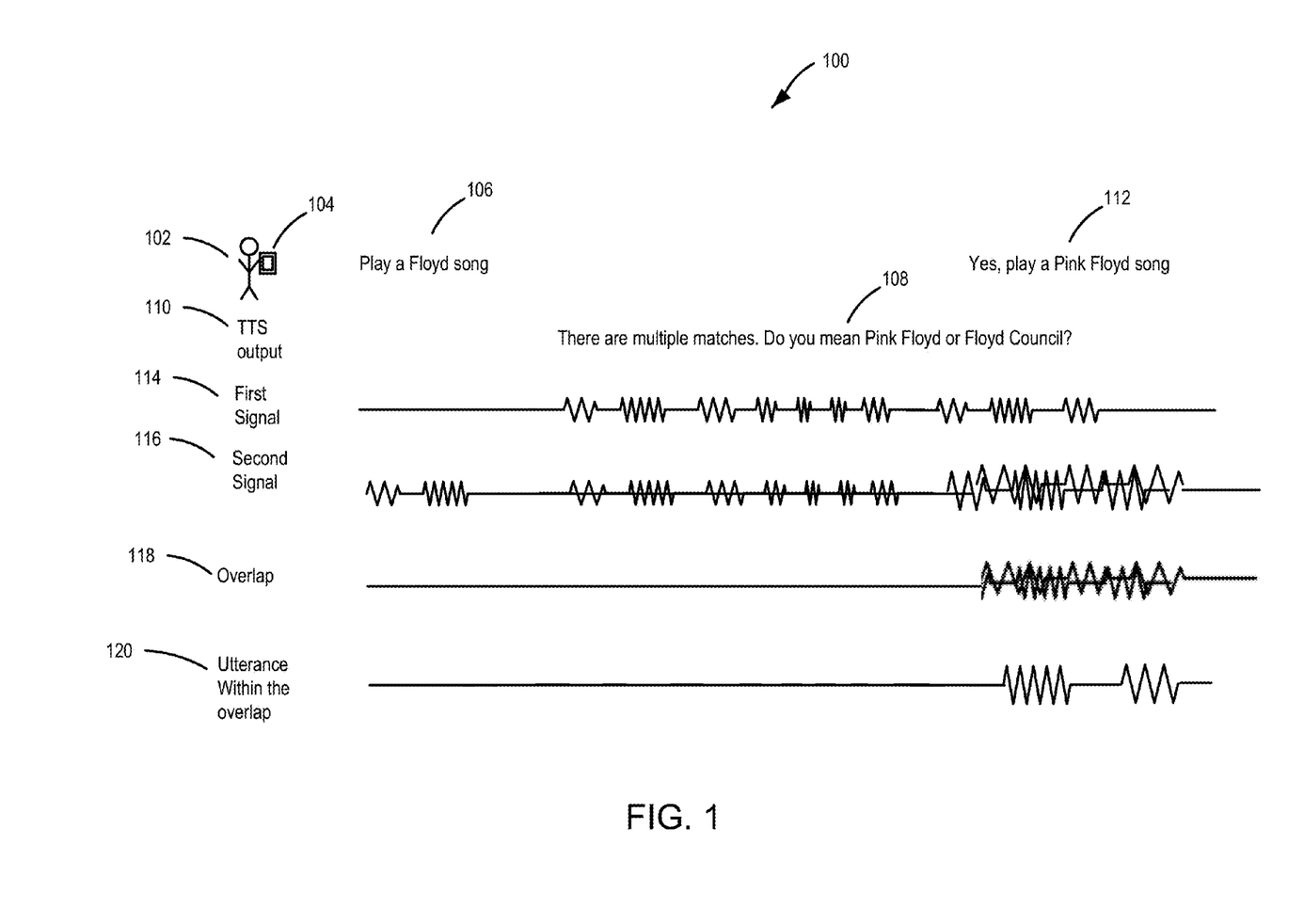
FIG. 1 is a diagram of example signals and utterance during a voice-based exchange between a user and a computing device.

FIG. 1 is a diagram of example signals and utterance 100 during a voice-based exchange between a user 102 and a computing device 104 such as a smartphone. In the example depicted in FIG. 1, the user 102 provides a voice-based instruction to the computing device 104 by uttering the instruction 106: "Play a Floyd song." In response to the instruction 106, computing device provides an audible response 108 as an output 110 from a text-to-speech (TTS) system associated with the computing device 104. In this particular example, the response 108 to the instruction 106 is: "There are multiple matches. Do you mean Pink Floyd or Floyd Council?" The response 108 corresponds to a signal waveform that is referred to in FIG. 1 as the first signal 114. In some cases, the user 102 may not need to listen to the entire response 108 before realizing what additional input is being requested by the computing device 104. Accordingly, the user may start providing another instruction 112 at a time when a TTS output 110 is still being played back. In this particular example, the user 102 starts providing the instruction 112: "Yes, play a Pink Floyd song," such that the instruction 112 overlaps with the response 108. As a result, a microphone of the computing device 104 captures an audio signal that includes both the TTS output 110, as well as the instruction 112 provided by the user. This is represented as the second signal 116 in FIG. 1. The event of a user providing voice-based input (e.g., the instruction 112) during a time when a TTS output 110 is being played may sometimes be referred to as a "barge-in."

This document describes techniques for suppressing the TTS output 110 from the second signal 116, such that utterance 120 representing the instruction 112 can be recognized. In some implementations, because the first signal 114 is known to the speech recognition system, the first signal 114 is used as a reference signal to determine a portion of the second signal where an overlap 118 between the reference signal and utterance occurs. Features extracted from the known first signal 114 can then be used to recover the utterance 120 from the overlap 118. For example, dominant speech units (e.g., phonemes) identified from the first signal 114 can be suppressed from the overlap 118 to recover the utterance 120, thereby facilitating accurate speech recognition during a barge-in.

Figure 2:
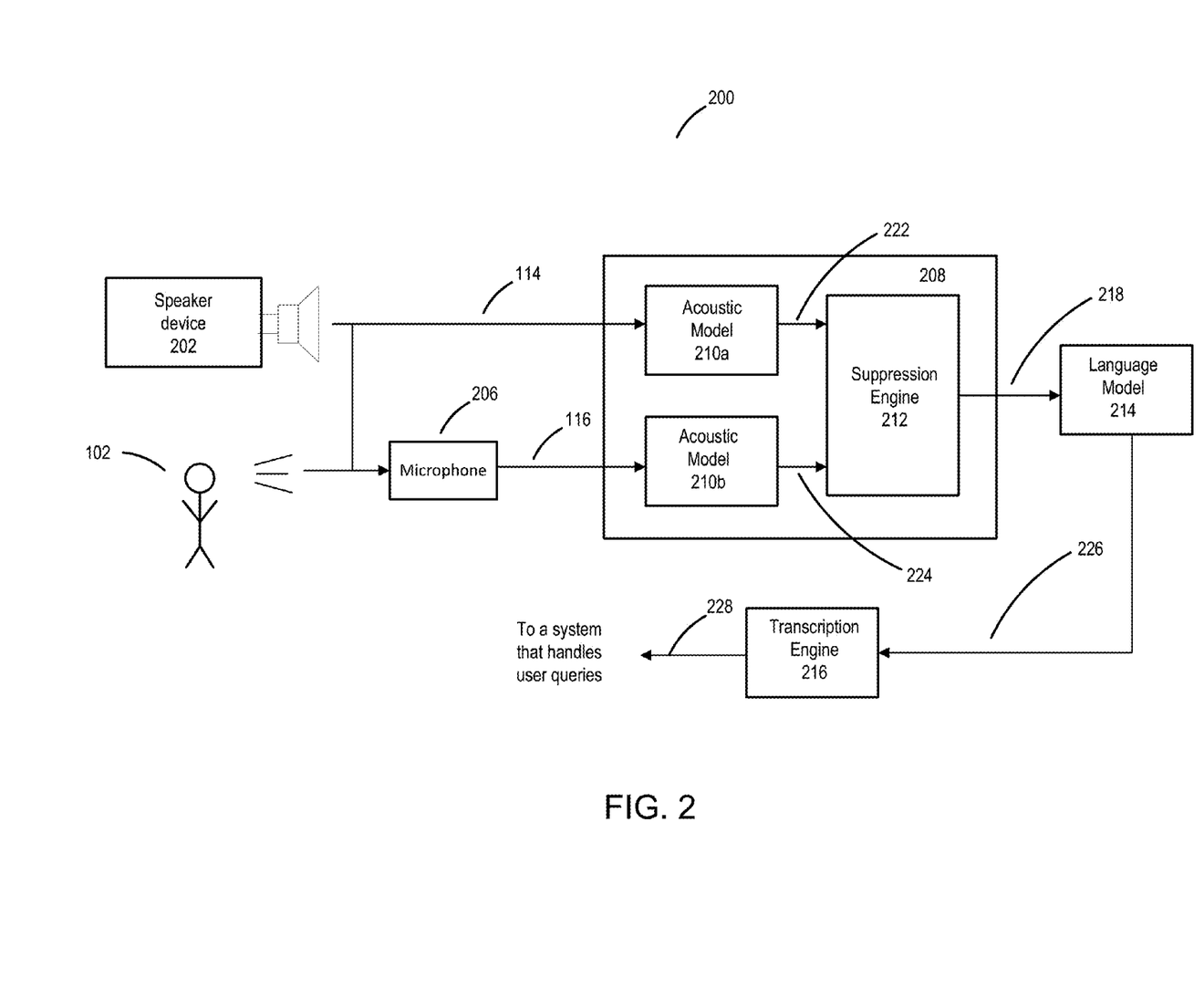
FIG. 2 is a diagram of an example system that identifies speech in the event of a barge-in by the user.

FIG. 2 is a diagram of an example system 200 that identifies speech in the event of a barge-in by the user 102. The system 200 includes a speaker device 202 that provides audio output, for example, from text-based transcription data. The speaker device 202 can be a part of a larger system (e.g., a TTS system, a media player, or a navigational system) that provides audio outputs. In some implementations, another system, such as one that renders symbolic linguistic representations (e.g., phonetic transcriptions) to speech may also be used either in conjunction with or in the place of the TTS system. During a barge-in event, audio output from the speaker device 202 and utterance by the user 102 are captured by the microphone 206, and the system 200 identifies the utterance from the captured audio.

The signal (also referred to as the first signal) 114 produced by the speaker device 202 is known to the system 200, and can be used as a reference signal. Both the first signal 114 and a second signal 116 (based on the audio captured by the microphone 206) are provided to a speech recognizer 208. The speech recognizer 208, in turn, provides an output 218 obtained by recognizing the utterance of the user in the captured audio while suppressing the known reference signal 114. The output 218 is provided to a language model 214 which outputs information representing words and/or phrases. The output 220 of the language model is then provided to a transcription engine 216 that converts the recognized words and/or phrases to text. The output of the transcription engine can then be provided to a system configured to handle user queries.

In some implementations, the second signal 116 captured by the microphone 206 may be sampled at a particular frequency and resolution. For example, the speech recognizer 208 may require the second signal 116 to be sampled at 8 kHz, 16 kHz, 44.1 kHz, or any other sample rate, and the resolution may be 16 bits, 32 bits, or any other resolution. In some implementations, the second signal may be sampled and digitized in accordance with the sampling rate and resolution of the first signal provided to the speech recognizer 208 by the speaker device 202. In some implementations, the sampling rate and/or resolution of the first and second signals can be different.

In some implementations, the second signal 116 is aligned with the known reference signal 114 before the signals 114 and 116 are fed to the speech recognizer 208. The alignment can be done by first storing samples from both the first signal 114 and the second signal 116, in respective memory buffers. The memory buffers may be implemented as a storage location within a computing device that determined the alignment between the reference and captured signals. The capacity of the reference signal buffer R (not shown) storing samples of the first signal (or reference signal) 114 can be denoted as R2, and the capacity of the captured signal buffer C (not shown) storing samples of the second signal (or captured signal) 116 can be denoted as C2. When R2 and C2 are denoted in milliseconds, the reference signal buffer R stores at most the last R2 milliseconds of reference audio samples, and the captured signal buffer C stores at most the last C2 milliseconds of captured audio samples. When the buffers are updated, the captured signal buffer C holds at least C1 milliseconds of captured samples, and the reference signal buffer R holds at least R1 milliseconds of reference samples. The parameters R1, R2, C1, and C2 may be related as: 0<C1<=C2<R1<=R2. Representative values (in milliseconds) for these parameters can be: C1=300, C2=300, R1=400, R2=1000. Other values may also be empirically determined, based on, for example, acceptable latency.

In some implementations, the alignment between the captured samples and the reference samples is determined under an assumption that the most recently received reference sample is newer than the most recently received captured sample. In other words, the computing device determining the alignment between the reference and captured signals is assumed to receive the reference samples before receiving the corresponding captured samples. In some implementations, the alignment between the reference and captured samples can be calculated as follows.

$$sC = \text{Sign}(\text{Diff}(C)) \quad (1)$$

$$sR = \text{Sign}(\text{Diff}(R)) \quad (2)$$

wherein the Diff(.) operator maps a sequence of numbers to differences between consecutive numbers of the sequence, and the Sign (.) operator maps negative numbers to −1, positive numbers to +1, and 0 to 0.

Next, cross-correlation between the vectors sC and sR is calculated for all lags from the interval [0, Length(sR)−Length(sC)]. The cross-correlation vector can be represented as CXR. Local maxima (or peaks) are then identified within the vector Abs(CXR), wherein the Abs(.) operator maps elements of a sequence to the corresponding absolute values. If an element within the vector Abs(CXR) is greater than a threshold T, the position of the peak is taken to likely identify a time alignment between the captured audio samples and the reference samples. Therefore, the position of the peak corresponds to a specific lag between the captured samples and the reference samples. T is empirically chosen from range (0, 1]. For example, in some cases, T can be chosen to be 0.2. In some implementations, if the sampling rate for the captured signal is higher than that of the reference signal, the captured signal can be down-sampled to a rate substantially equal to the sampling rate of the reference signal. Alternatively, if the sampling rate of the captured signal is lower than that of the reference signal, the captured signal can be up-sampled (or the reference signal can be down-sampled) such that the sampling rates of the two signals are substantially equal.

In some implementations, the aligned signals 114 and 116 are provided to the speech recognizer 208. The speech recognizer 208 can be configured to extract acoustic features from the signals 114 and 116, and classify the extracted acoustic features separately using one or more acoustic models 210. The acoustic features extracted from the signals can be represented using, for example, mel-frequency cepstral coefficients, cepstral coefficients, spectral vectors, spectrograms, filterbank energies, fast Fourier transform (FFT) frames or other time-frequency or frequency domain representations. In some implementations, the extracted acoustic features may be represented as one or more feature vectors. The acoustic features can be extracted using a processor either included within, or external to the system 200. In some implementations, the processor may generate the acoustic features based on one or more audio frames corresponding to either the signal 114 or the signal 116. In some implementations, the audio frames may be, for example, between ten and twenty-five milliseconds in length.

The acoustic features extracted from the signals 114 and 116 are then classified separately. For example, the acoustic features extracted from the signal 114 can be classified using an acoustic model 210a, and the acoustic features extracted from the signal 116 can be classified using another acoustic model 210b. The acoustic model 210a may or may not be different from the acoustic model 210b. In general, an acoustic model 210 can be configured to establish statistical representations for the features or feature vectors extracted from the signals 114 and 116. Various types of acoustic models 210 can be used by the speech recognizer 208. For example, the acoustic model can be a classifier such as a neural network. In other implementations, the acoustic model 210 can include a Gaussian mixture model (GMM), a Hidden Markov Model (HMM), a segmental model, a super-segmental model, a hidden dynamic model, a maximum entropy model, or a conditional random field.

The output from each of the acoustic models 210 can be a vector of ordered pairs of speech units (e.g., phonemes or tri-phones) and corresponding weights. In some implementations, the output of the acoustic model can be a vector that includes a weight (also referred to as a score or probability) for each known speech unit (e.g., a phoneme or tri-phone) in a given language. In some implementations, the acoustic model output 222 corresponding to the signal 114, and the acoustic model output 224 corresponding to the signal 116 is provided to a suppression engine 212, which suppresses the output of the Speaker device 202 to recognize the utterance within the signal 116.

The suppression engine 212 can be configured to modify the acoustic features of the acoustic model output 224 based on features of the acoustic model output 222, such that the output 218 of the suppression engine 212 represents acoustic features that predominantly represents the utterance of the user 102. In some implementations, the suppression engine 212 can be configured to subtract a feature vector representing the reference signal 114 from a feature vector representing the signal 116. In some implementations, the suppression engine can be configured to identify the most dominant phonemes from the reference signal 114 (for example, by identifying a predetermined number of the largest values from the corresponding feature vector), and modify the corresponding feature vector of the signal 116 accordingly. For example, the identified dominant phonemes can be suppressed in the corresponding feature vector of the signal 116 to reduce the effect of the speaker device output captured by the microphone 206. In some implementations, the suppression engine 212 can be configured to identify phonemes that appear (i.e., have weights above a predetermined threshold) in feature vectors for both signals. The suppression engine can then be configured to modify the feature vector of the signal 116 in a way that such common phonemes are suppressed in the modified feature vector.

In some implementations, to avoid over-suppressing phonemes, a reference output vector (corresponding to the output 222) can be weighted appropriately in accordance with a weighting function, before being used to modify the acoustic model output 224. The weighting function can be chosen, for example, in a way such that a positive probability value is never completely eliminated from a feature vector corresponding to the acoustic model output 224. The acoustic models 210, and the suppression engine 212 can be implemented on a computing device as a combination of software and hardware modules. For example, the acoustic models 210 and the suppression engine can be implemented using one or more processors configured to execute appropriate machine readable instructions to perform various combinations of functionalities described above.

The output 218 of the suppression engine 212 can be passed to subsequent stages of the system 200. In general, the output 218 of the suppression engine represents a signal where sounds present in the reference audio signal 114 are suppressed from the signal 116 captured by the microphone 206. In some implementations, the output 218 can be provided to a language model 214 that determines a likelihood of word and phrase sequences from the phonemes in the output 218. The language model 214 can be used, for example, to capture properties of the language (e.g. English) being recognized, and predict the next word in a sequence. Therefore, the language model 214 may be used to constrain a search among alternative word or phrase sequence hypotheses during recognition. For example, the language model 214 can be used to determine whether the speaker likely said "let's recognize speech," or "let's wreck a nice beach," from similar sounding sequence of phonemes. The language model 214 can be, for example, a unigram model, an n-gram model, or another model such as a positional language model, factored language model, or cache language model. Even though FIG. 2 shows the language model 214 to be external to the speech recognizer 208, the language model 214 can also be implemented as a part of the speech recognizer 208. The language model can be implemented as a separate hardware module, or using a processor that executes appropriate machine readable instructions to perform the above-mentioned functionalities.

In some implementations, the output 226 of the language model 214 can be provided to a transcription engine 216 that generates text-based strings based on the output 226. In some implementations, the text strings generated as an output 228 of the transcription engine 216 can be provided to a system that handles user queries based on such strings.

Figure 3:
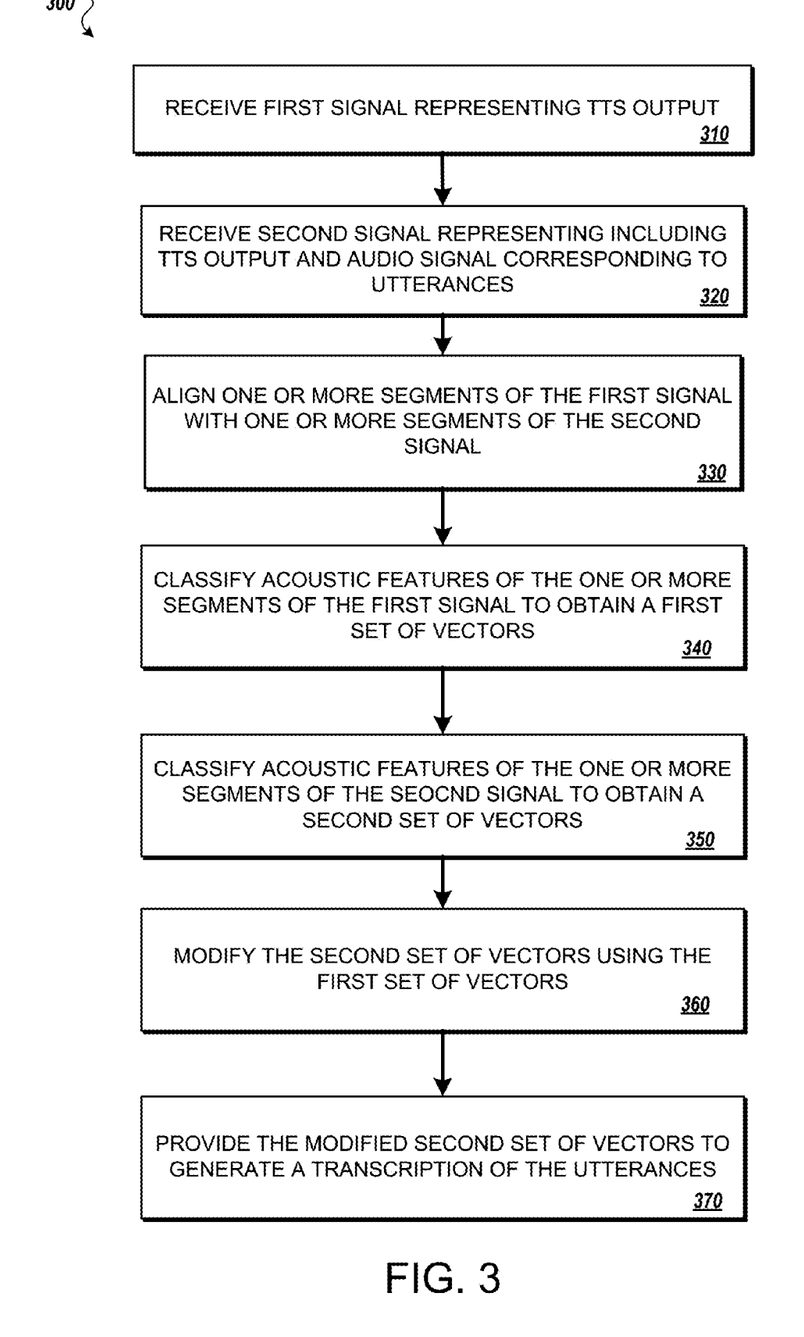
FIG. 3 is a diagram of an example process for identifying speech in the event of a barge-in by the user.

FIG. 3 is a diagram of an example process 300 for identifying speech in the event of a barge-in by the user. The process 300 may be performed, for example, by one or more processors used within the system 200 of FIG. 2. The process 300 includes receiving a first signal that represents a TTS output (310). Because the first signal is a determinate signal generated by a TTS system, the signal is known, and can be used as a reference signal in separating user-utterance from TTS feedback in the event of a barge-in.

The process also includes receiving a second signal that includes both the TTS output, as well as an audio signal corresponding to utterance of a speaker (320). For example, if the speaker barges-in by speaking at a time when a TTS output is being played back, a microphone may pick up both audio to produce the second signal. The process further includes aligning one or more segments of the first signal with one or more segments of the second signal (330). Such temporal alignment can be performed, for example, by storing samples from both the first and second signals within respective memory buffers, and cross-correlating portions of the first signal with portions of the second signal. In some implementations, the cross-correlation product can be analyzed to identify one or more peaks. If an identified peak satisfies a threshold condition (e.g., has a magnitude greater than a predetermined threshold), an alignment can be determined based on a location of the identified peak in the cross-correlation product. For example, the location of the peak may give a relative temporal separation between the first and second signals, and can be used to align the signals. Temporal alignment of two signals has been described above with reference signals 114 and 116 of FIG. 1.

The process 300 further includes classifying acoustic features of the one or more segments of the first signal to obtain a first set of vectors (340), and classifying acoustic features of the one or more segments of the second signal to obtain a second set of vectors (350). The acoustic features can include, for example, mel-frequency cepstral coefficients, cepstral coefficients, spectral vectors, spectrograms, filterbank energies, fast Fourier transform (FFT) frames or other time-frequency or frequency domain representations. The acoustic features can be classified using an acoustic model. The acoustic model can include, for example, a neural network, a Gaussian mixture model (GMM), a Hidden Markov Model (HMM), a segmental model, a super-segmental model, a hidden dynamic model, a maximum entropy model, or a conditional random field. In some implementations, each of the first and second set of vectors can include a set of phonemes and a weight corresponding to each phoneme in the set of phonemes.

The process 300 also includes modifying the second set of vectors using the first set of vectors (360). This can include, for example, identifying one or more phonemes that are present both in the first and the second set of vectors. The weights in second set of vectors corresponding to the identified phonemes can then be adjusted such that the identified phonemes are suppressed in the modified second set. In some implementations, the adjusted weights in the modified second set of vectors can be normalized such that the sum of the weights is substantially equal to unity.

The process 300 may also include providing the modified second set of vectors to generate a transcription of utterance in the second signal (370). For example, the modified second set of vectors can be provided to a language model (e.g., the language model 214 of FIG. 2), and the output of the language model can be provided to a transcription engine (e.g., the transcription engine 216 of FIG. 2) to generate the transcription.

Figure 4:
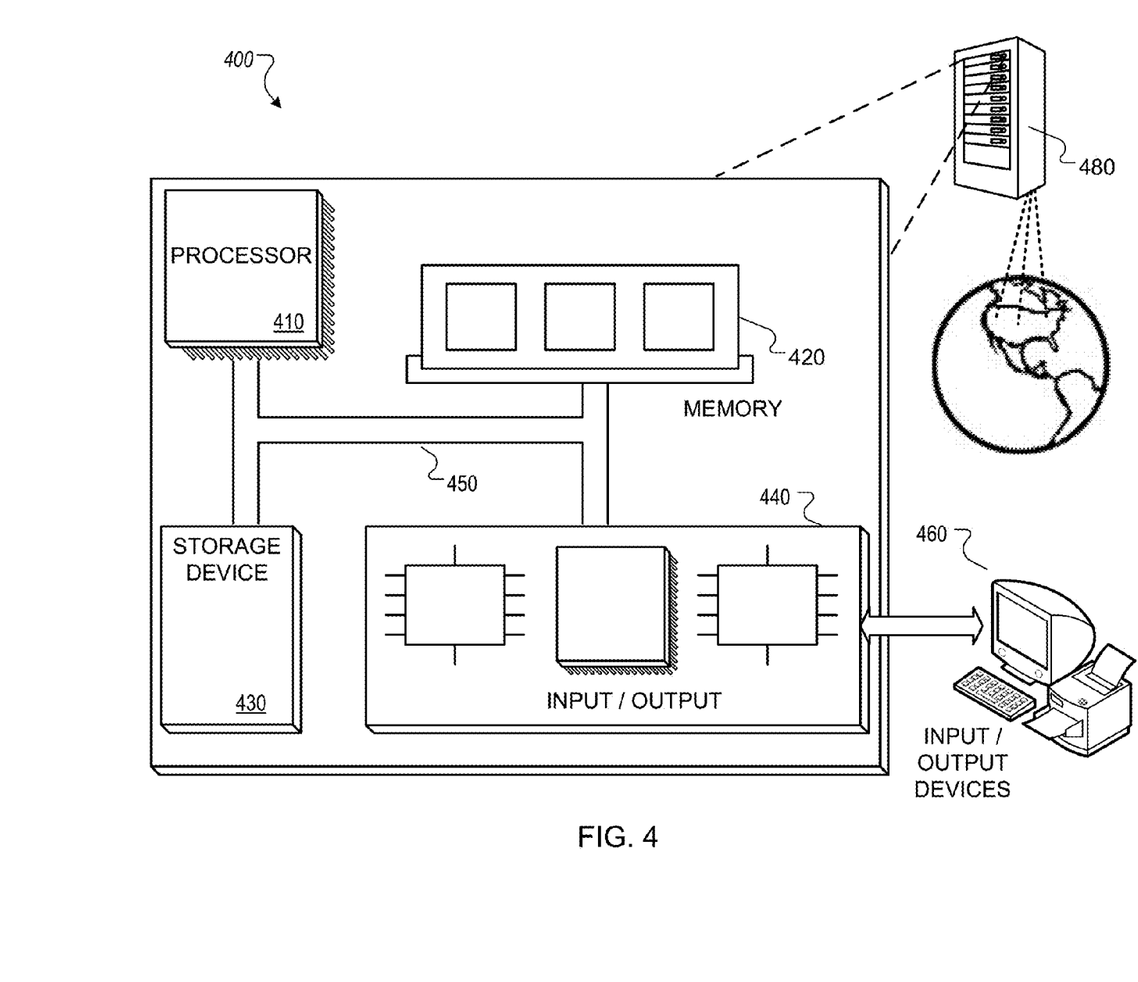
FIG. 4 is a block diagram of an example of a computing device

FIG. 4 is block diagram of an example computer system 400 that may be used in performing the processes described herein. For example, the speech recognizer 208, acoustic models 210, language model 214, and transcription engine 216, can include at least portions of the computing device 400 described below. Computing device 400 is intended to represent various forms of digital computers, such as laptops, desktops, workstations, servers, blade servers, mainframes, and other appropriate computers. Computing device 400 is further intended to represent various typically non-mobile devices, such as televisions or other electronic devices with one or more processors embedded therein or attached thereto. Computing device 400 also represents mobile devices, such as personal digital assistants, touchscreen tablet devices, e-readers, cellular telephones, and smartphones.

The system 400 includes a processor 410, a memory 420, a storage device 430, and an input/output module 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output module 440 provides input/output operations for the system 400. In one implementation, the input/output module 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460.

The web server, advertisement server, and impression allocation module can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Example computer system 400 can include a server. Various servers, which may act in concert to perform the processes described herein, may be at different geographic locations, as shown in the figure. The processes described herein may be implemented on such a server or on multiple such servers. As shown, the servers may be provided at a single location or located at various places throughout the globe. The servers may coordinate their operation in order to provide the capabilities to implement the processes.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a non-transitory computer-readable medium, for execution by, or to control the operation of, a processing system. The non-transitory computer readable medium can be a machine readable storage device, a machine readable storage substrate, a memory device, or a combination of one or more of them.

In this regard, various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Content, such as ads and GUIs, generated according to the processes described herein may be displayed on a computer peripheral (e.g., a monitor) associated with a computer. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems and methods discussed here collect personal information about users, or may make use of personal information, the users may be provided with an opportunity to control whether programs or features that may collect personal information (e.g., information about a user's calendar, social network, social actions or activities, a user's preferences, or a user's current location), or to control whether and/or how to receive content that may be more relevant to (or likely to be clicked on by) the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected (and/or used) about him or her.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations may fall within the scope of the following claims.

The invention claimed is:

1. A computer implemented method comprising:
receiving, at a processing system, a first signal representing an output of a speaker device;
receiving, at the processing system, a second signal comprising (i) the output of the speaker device and (ii) an audio signal corresponding to an utterance of a speaker;
aligning, by the processing system, one or more segments of the first signal with one or more segments of the second signal;
classifying acoustic features of the one or more segments of the first signal to obtain a first set of vectors associated with speech units, wherein each vector in the first set of vectors comprises a phoneme and an associated weight;
classifying acoustic features of the one or more segments of the second signal to obtain a second set of vectors associated with speech units, wherein each vector in the second set of vectors comprises a phoneme and an associated weight;
modifying the second set of vectors using the first set of vectors to obtain a modified second set of vectors, wherein modifying the second set comprises:
identifying one or more speech units that are present in the first set of vectors and the second set of vectors,
adjusting the weights associated with the identified speech units in the second set of vectors to indicate that the identified speech units are candidates for being suppressed from the modified second set of vectors, and
suppressing the identified speech units from the modified second set of vectors based at least in part on the adjusted weights, wherein the modified second set of vectors represents a suppression of the output of the speaker device in the second signal; and
providing the modified second set of vectors to generate a transcription of the utterance of the speaker.

2. The method of claim 1, wherein the acoustic features comprise mel-frequency cepstral coefficients.

3. The method of claim 1, further comprising:
normalizing the adjusted weights of the modified second set of vectors such that a sum of the normalized and adjusted weights is substantially equal to unity.

4. The method of claim 1, wherein the identified speech units comprise phonemes or triphones.

5. The method of claim 1, wherein the first and second sets of vectors are computed using an acoustic model.

6. The method of claim 5, wherein the acoustic model includes one of a Gaussian mixture model (GMM) or a neural network.

7. The method of claim 1, wherein aligning the one or more segments of the first signal with one or more segments of the second signal comprises:
computing, using a processing device, a cross correlation product between a portion of the first signal and a portion of the second signal;
determining whether a magnitude of an identified peak in the cross correlation product satisfies a threshold condition; and
determining a temporal alignment based on a position of the identified peak that satisfies the threshold condition.

8. The method of claim 1, wherein the output of the speaker device is based on an output of a text-to-speech system.

9. A system comprising:
a speech recognition engine comprising memory and one or more processors, the speech recognition engine configured to receive:
a first signal representing an output of a speaker device, and
a second signal comprising (i) the output of the speaker device and (ii) an audio signal corresponding to an utterance of a speaker, wherein the speech recognition engine comprises a suppression engine configured to:
align one or more segments of the first signal with one or more segments of the second signal, classify acoustic features of the one or more segments of the first signal to obtain a first set of vectors associated with speech units, wherein each vector in the first set of vectors comprises a phoneme and an associated weight, classify acoustic features of the one or more segments of the second signal to obtain a second set of vectors associated with speech units, wherein each vector in the second set of vectors comprises a phoneme and an associated weight, modify the second set of vectors using the first set of vectors, wherein the suppression engine is further configured to:

identify one or more speech units that are present in the first set of vectors and the second set of vectors, adjust the weights associated with the identified speech units in the second set of vectors to indicate that the identified speech units are candidates for being suppressed from the modified second set of vectors, and suppress the identified speech units from the modified second set of vectors based at least in part on the adjusted weights, wherein the modified second set of vectors represents a suppression of the output of the speaker device in the second signal; and provide the modified second set of vectors to generate a transcription of the utterance of the speaker.

10. The system of claim 9, wherein the speech recognition engine provides the modified second set of vectors to a transcription engine to generate a transcription of the utterance of the speaker.

11. The system of claim 9, wherein the acoustic features comprise mel-frequency cepstral coefficients.

12. The system of claim 9, wherein the identified speech units comprise phonemes or triphones.

13. The system of claim 9, wherein the speech recognition engine is configured to access an acoustic model that is used in obtaining the first and second set of vectors.

14. The system of claim 9, wherein the suppression engine is configured to:

align the one or more segments of the first signal with the one or more segments of the second signal, wherein the suppression engine is further configured to:

compute a cross correlation product between a portion of the first signal and a portion of the second signal;

determine whether a magnitude of an identified peak in the cross correlation product satisfies a threshold condition; and determine a temporal alignment based on a position of the identified peak that satisfies the threshold condition.

15. The system of claim 9, wherein the output of the speaker device is based on an output of a text-to-speech system.

16. One or more non-transitory machine-readable storage devices storing instructions that, upon execution by one or more processing devices, cause the one or more processing devices to perform operations comprising:

receiving a first signal representing an output of a speaker device;

receiving a second signal comprising (i) the output of the speaker device and (ii) an audio signal corresponding to an utterance of a speaker;

aligning one or more segments of the first signal with one or more segments of the second signal;

classifying acoustic features of the one or more segments of the first signal to obtain a first set of vectors associated with speech units, wherein each vector in the first set of vectors comprises a phoneme and an associated weight;

classifying acoustic features of the one or more segments of the second signal to obtain a second set of vectors associated with speech units, wherein each vector in the second set of vectors comprises a phoneme and an associated weight;

modifying the second set of vectors using the first set of vectors, wherein modifying the second set comprises:

identifying one or more speech units that are present in the first set of vectors and the second set of vectors, adjusting the weights associated with the identified speech units in the second set of vectors to indicate that the identified speech units are candidates for being suppressed from the modified second set of vectors, and suppressing the identified speech units from the modified second set of vectors based at least in part on the adjusted weights, wherein the modified second set of vectors represents a suppression of the output of the speaker device in the second signal; and providing the modified second set of vectors to generate a transcription of the utterance of the speaker.

* * * * *